(12) United States Patent
Okada et al.

(10) Patent No.: US 8,160,771 B2
(45) Date of Patent: Apr. 17, 2012

(54) VEHICULAR DATA RECORDING APPARATUS

(75) Inventors: Satoru Okada, Nishikamo-gun (JP);
Motomi Iyoda, Seto (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 707 days.

(21) Appl. No.: 11/997,814

(22) PCT Filed: Jul. 31, 2006

(86) PCT No.: PCT/IB2006/002141
§ 371 (c)(1),
(2), (4) Date: Feb. 4, 2008

(87) PCT Pub. No.: WO2007/017730
PCT Pub. Date: Feb. 15, 2007

(65) Prior Publication Data
US 2008/0234890 A1 Sep. 25, 2008

(30) Foreign Application Priority Data

Aug. 5, 2005 (JP) ................................. 2005-228030

(51) Int. Cl.
*G06F 12/00* (2006.01)
(52) U.S. Cl. ............ 701/35; 701/45; 340/436; 340/438; 348/148
(58) Field of Classification Search .................. None
See application file for complete search history.

(56) References Cited

U.S. PATENT DOCUMENTS

| 4,638,289 | A | * | 1/1987 | Zottnik | 246/45 |
|---|---|---|---|---|---|
| 4,644,494 | A | * | 2/1987 | Muller | 711/152 |
| 5,581,464 | A | * | 12/1996 | Woll et al. | 701/35 |
| 5,638,273 | A | * | 6/1997 | Coiner et al. | 701/35 |
| RE35,590 | E | * | 8/1997 | Bezos et al. | 455/456.1 |
| 5,997,171 | A | * | 12/1999 | Talbott | 702/189 |
| 6,067,488 | A | * | 5/2000 | Tano | 701/35 |
| 6,163,338 | A | * | 12/2000 | Johnson et al. | 348/148 |
| 6,185,490 | B1 | * | 2/2001 | Ferguson | 701/35 |
| 6,246,933 | B1 | * | 6/2001 | Bague | 701/35 |
| 6,345,219 | B1 | * | 2/2002 | Klemens | 701/45 |
| 6,389,340 | B1 | * | 5/2002 | Rayner | 701/35 |
| 6,445,986 | B1 | * | 9/2002 | Costello | 701/35 |
| 6,490,513 | B1 | * | 12/2002 | Fish et al. | 701/35 |
| 6,535,804 | B1 | * | 3/2003 | Chun | 701/35 |
| 6,629,030 | B2 | * | 9/2003 | Klausner et al. | 701/35 |
| 6,630,884 | B1 | * | 10/2003 | Shanmugham | 340/436 |

(Continued)

FOREIGN PATENT DOCUMENTS

EP 0 847 029 A2 6/1998

(Continued)

*Primary Examiner* — Jonathan M Dager
(74) *Attorney, Agent, or Firm* — Sughrue Mion, PLLC

(57) ABSTRACT

A vehicular data recording apparatus includes crash detection portion (12) for detecting a crash of a vehicle, and recording process portion (14) for recording and retaining output data of various vehicle-mounted sensors (20, 30, 40, 50) mounted in the vehicle, in a non-volatile memory (70). If a crash is detected by the crash detection portion (12), a data recording/retaining process relevant to the crash is performed by the recording process portion. If a plurality of crashes different in the crash form are detected continually in a short time by the crash detection portion, the recording process portion performs the data recording/retaining process relevant to each crash in accordance with a predetermined order of priority based on the crash form of each crash.

12 Claims, 8 Drawing Sheets

U.S. PATENT DOCUMENTS

| | | | |
|---|---|---|---|
| 6,746,043 B2 * | 6/2004 | Ishida | 280/735 |
| 2002/0198640 A1 * | 12/2002 | Gehlot et al. | 701/35 |
| 2003/0065432 A1 * | 4/2003 | Shuman et al. | 701/48 |
| 2003/0081121 A1 * | 5/2003 | Kirmuss | 348/143 |
| 2003/0154009 A1 * | 8/2003 | Basir et al. | 701/35 |
| 2003/0168839 A1 | 9/2003 | Miyoshi | |
| 2003/0223317 A1 * | 12/2003 | Soto et al. | 369/29.02 |
| 2004/0104812 A1 * | 6/2004 | Mayor | 340/425.5 |
| 2004/0203696 A1 * | 10/2004 | Jijina et al. | 455/420 |
| 2005/0137757 A1 * | 6/2005 | Phelan et al. | 701/1 |
| 2005/0162513 A1 * | 7/2005 | Chan | 348/118 |
| 2006/0012683 A9 * | 1/2006 | Lao et al. | 348/207.99 |
| 2006/0041349 A1 * | 2/2006 | Chinnadurai et al. | 701/35 |
| 2006/0089767 A1 * | 4/2006 | Sowa | 701/29 |
| 2006/0095175 A1 * | 5/2006 | deWaal et al. | 701/33 |
| 2006/0212195 A1 * | 9/2006 | Veith et al. | 701/35 |
| 2007/0035632 A1 * | 2/2007 | Silvernail et al. | 348/211.3 |
| 2007/0260363 A1 * | 11/2007 | Miller | 701/2 |
| 2008/0258939 A1 * | 10/2008 | Smith et al. | 340/989 |
| 2009/0222163 A1 * | 9/2009 | Plante | 701/35 |
| 2010/0171831 A1 * | 7/2010 | Arant | 348/148 |
| 2010/0174449 A1 * | 7/2010 | Kim | 701/35 |

FOREIGN PATENT DOCUMENTS

| | | |
|---|---|---|
| JP | 6-234342 A | 8/1994 |
| JP | 7-277230 A | 10/1995 |
| JP | 3284796 B2 | 6/1996 |
| JP | 3500767 B2 | 10/1996 |
| JP | 2001-199370 A | 7/2001 |

* cited by examiner

FIG. 4

| | CONTROL-OBJECT AIRBAG | SENSOR FOR DETERMINATION | EDR RECORD |
|---|---|---|---|
| FRONT CRASH | FRONT IMPACT AIRBAGS | RIGHT FRONT SENSOR (RFx) | - |
| | | LEFT FRONT SENSOR (LFx) | - |
| | | FLOOR SENSOR (Tnx) | ○ |
| SIDE CRASH | SIDE IMPACT AIRBAGS<br>SIDE IMPACT CURTAIN SHIELD AIRBAGS | RIGHT B PILLAR SENSOR (RBpy) | ○ |
| | | LEFT B PILLAR SENSOR (LBpy) | (ONLY CRASH SIDE) |
| | | RIGHT C PILLAR SENSOR (RCpy) | ○ |
| | | LEFT C PILLAR SENSOR (LCpy) | (ONLY CRASH SIDE) |
| | | FLOOR SENSOR (Tny) | ○ |
| ROLLOVER | ROLLOVER CURTAIN SHIELD AIRBAGS | ROLL RATE SENSOR (RR) | ○ |
| | | FLOOR SENSOR (GY) | ○ |

VEHICULAR DATA RECORDING APPARATUS

BACKGROUND OF THE INVENTION

1. Field of the Invention

The invention relates to a vehicular data recording apparatus that includes crash detection means for detecting a crash of a vehicle, and recording process means for recording and retaining output data of various vehicle-mounted sensors mounted in the vehicle, wherein if a crash is detected by the crash detection means, a data recording/retaining process relevant to the crash is performed by the recording process means.

2. Description of the Related Art

Conventionally, a vehicular data recording apparatus that includes record means for recording outputs of various vehicle-mounted sensors mounted in a vehicle, and crash detection means for detecting a crash of the vehicle, and that records and retains vehicle-mounted sensor outputs provided before and after a crash of the vehicle, the vehicular data recording apparatus being characterized by including behavioral sudden change detection means for detecting a sudden change in the vehicle behavior, and record retention control means for, if a crash of the vehicle is detected by the crash detection means, performing a record retention control in a crash mode so as to retain output records provided by vehicle behavior-relevant sensors among the vehicle-mounted sensors during a predetermined period before and after the crash, and for, if a sudden change in the vehicle behavior is detected by the behavioral sudden change detection means, performing a record retention control in a behavioral sudden change mode so as to retain output records provided by vehicle behavior-relevant sensors among the vehicle-mounted sensors during a predetermined period after the behavioral sudden change, has been known (e.g., Japanese Patent Application Publication No. JP-A-07-277230).

In some cases of actual crashes of vehicles, a plurality of crashes, including a secondary crash, occur in proximity in time; for example, a front crash is followed by occurrence of a side crash and a rollover. However, in the related art, the case where a plurality of crashes occur in proximity in time is not assumed. Furthermore, for example, record retention can become impossible due to disconnection of a battery prior to a batch write-in process, and data concerning the initial crash can be overwritten by data concerning a later crash in some cases. Therefore, there is possibility that necessary data may not be recorded and unnecessary data may be recorded. Thus, there is a problem of being unable to reliably and efficiently record and retain data that is necessary and sufficient for analysis of causes of the crash, and the like.

SUMMARY OF THE INVENTION

Accordingly, it is an object of the invention to provided a vehicular data recording apparatus capable of reliably and efficiently recording and retaining data that is necessary and sufficient for analysis of causes of a crash, and the like.

To achieve the aforementioned object, a vehicular data recording apparatus in a first aspect of the invention, which includes crash detection means for detecting a crash of a vehicle, and recording process means for recording and retaining output data of various vehicle-mounted sensors mounted in the vehicle, in a non-volatile memory. If a crash is detected by the crash detection means, a data recording/retaining process relevant to the crash is performed by the recording process means. If a plurality of crashes are detected continually in a short time by the crash detection means, the recording process means performs the data recording/retaining process relevant to each crash in accordance with a predetermined order of priority of each crash.

In the first aspect, the order of priority of each crash may be an order based on a time of detection, and the data recording/retaining process relevant to a crash low in the order of priority may be prohibited. Furthermore, during the data recording/retaining process relevant to a first crash following detection of the first crash, the recording process means may prohibit the data recording/retaining process relevant to a crash other than the first crash.

In the first aspect, if crashes different in the crash form are detected continually in a short time by the crash detection means, the recording process means performs the data recording/retaining process relevant to each crash in accordance with an order of priority based on the crash form of each crash.

In the foregoing first aspect, the crash forms detected by the crash detection means may include a front crash, a side crash, and a rollover, and the front crash may be given a higher order of priority than the side crash and the rollover.

Furthermore, in the first aspect, a high order of priority may be given to a crash that is highly likely to interfere with a mounting position of the recording process means, or a mounting position of a battery that serves as an electric power source for a recording/retaining operation of the recording process means.

In the foregoing aspect, if, during the data recording/retaining process relevant to a first crash following detection of the first crash, a second crash higher in the order of priority than the first crash is detected by the crash detection means, the recording process means may interrupt the data recording/retaining process relevant to the first crash, and may perform the data recording/retaining process relevant to the second crash.

In the foregoing aspect, during an interruption of the data recording/retaining process of data relevant to the first crash, the data relevant to the first crash may be stored into a RAM. Furthermore, after the data recording/retaining process of the crash high in the order of priority is completed, the recording process means may perform writing of the data relevant to the crash low in the order of priority written in the RAM, into the non-volatile memory, and the data recording/retaining process.

In the foregoing aspect, the recording process means may perform the data recording/retaining process regarding the crash high in the order of priority, by a one-by-one write-in method.

In the first aspect, the recording process means may perform the data recording/retaining process relevant to the crash low in the order of priority after completing the data recording/retaining process relevant to the crash high in the order of priority.

In the first aspect, the crash detection means may perform detection of a crash, and determination of a crash form based on an output value of the various vehicle-mounted sensors mounted in the vehicle.

In the first aspect, data recorded and retained by the recording process means after a crash is detected by the crash detection means includes at least one of on/off information regarding a buckle switch, occupant detecting sensor information, on/off information regarding a manual cut switch of an airbag, a diagnostic code, a number of times of IG being on during a failure, a light-on duration of a failure lamp, a time parameter, a write completion flag, and a freeze signal.

The data recorded and retained by the recording process means may further include at least one of brake operation information, engine rotation speed information, shift position information, a vehicle speed, and an accelerator operation amount.

In the first aspect, if a crash is detected by the crash detection means, the recording process means may record and retain relevant information that indicates a state of an occupant and/or a state of the vehicle occurring at a time of detection of the crash or in a predetermined time preceding the time of detection of the crash, together with the output data of a predetermined vehicle-mounted sensor following the crash. If a plurality of crashes are detected continually in a short time by the crash detection means, the recording process means may not record or retain the relevant information concerning the second or later-detected crash.

In the first aspect, one event may be considered to last from occurrence of an initial crash until elapse of a predetermined time, and if another crash occurs within a same event, the same event may be considered as one event, and the recording process means may perform the data recording process relevant to the crash in correspondence to the event in which the crash occurred.

In the above-described aspect, if a plurality of crashes occur in the same event, it is permissible that predetermined information be recorded at a time of the first occurring crash in the same event, and the predetermined information be not recorded at times of the second and later occurring crashes in the same event.

The predetermined information is information common to a plurality of crashes that occur within a short time in the same event. According to the above-described aspect, information common to the crashes in the same event is recorded only at the time of the first occurring crash. As a result, inefficient use of process time and memory area can be avoided.

A method of performing data recording/retention relevant to a crash of a vehicle in the invention includes detecting a crash of the vehicle, and recording and retaining output data of various vehicle-mounted sensors mounted in the vehicle, in a non-volatile memory. If a plurality of crashes are detected continually in a short time, a data recording/retaining process relevant to each crash is performed in the recording and retaining step in accordance with a predetermined order of priority of each crash.

According to the invention, in accordance with the order of priority based on the time of detection of each crash, the data recording/retaining process relevant to a crash low in the order of priority is prohibited. Therefore, the apparatus of the invention is able to reliably and efficiently record and retain data that is necessary and sufficient for analysis of causes of a crash, and the like. Furthermore, since the data recording/retaining process relevant to each crash is performed in accordance with the order of priority based on the crash form of each crash, the apparatus of the invention is able to reliably and efficiently record and retain data that is necessary and sufficient for analysis of causes of a crash, and the like.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 4 is a diagram showing an example of record items related to sensor information related to the crash form;

DETAILED DESCRIPTION OF THE EXAMPLE EMBODIMENTS

Hereinafter, example embodiments of the invention will be described with reference to accompanying drawings.

Figure 1:
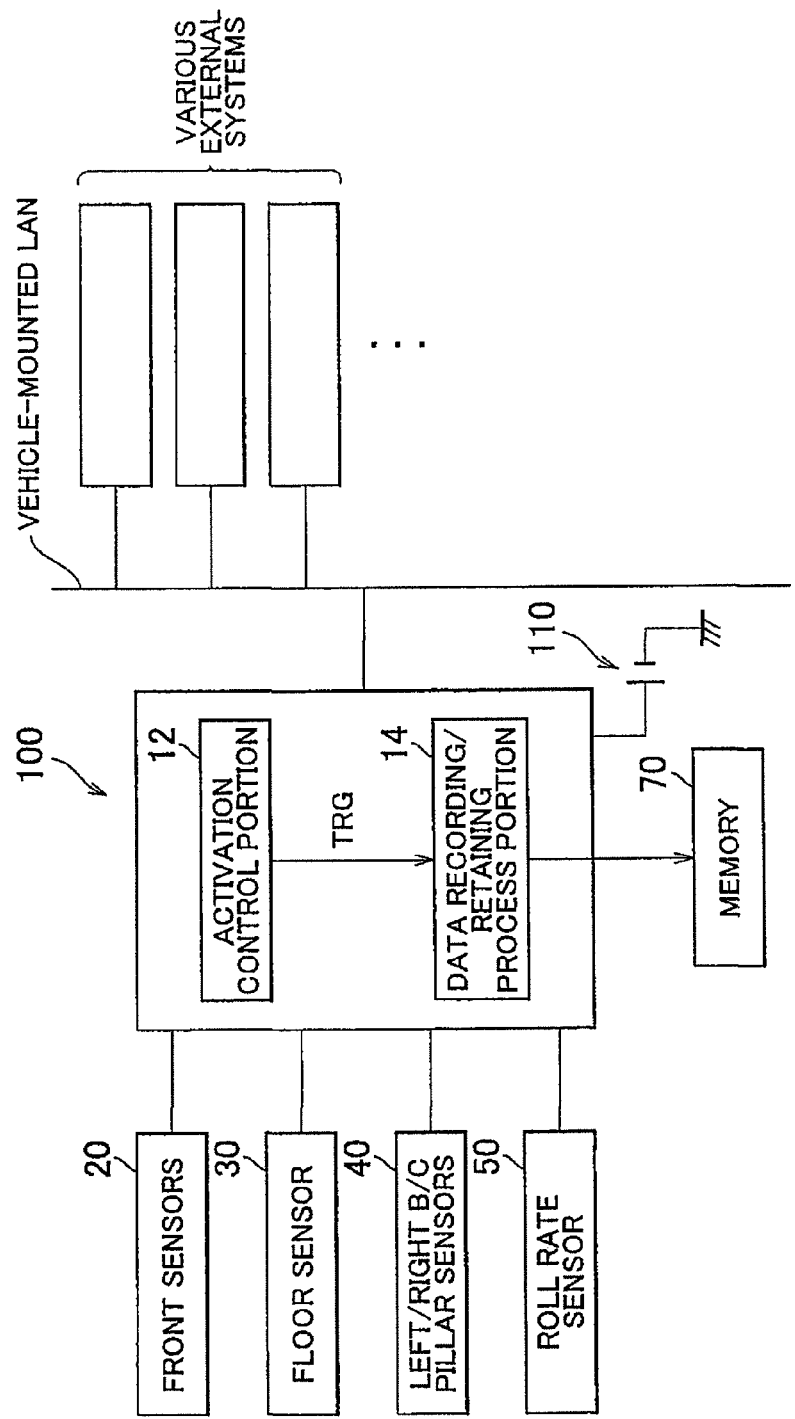
FIG. 1 is a system construction diagram showing an embodiment of the vehicular data recording apparatus of the invention.

FIG. 1 is a system construction diagram showing an embodiment of the vehicular data recording apparatus of the invention. A vehicular data recording apparatus of this embodiment is embodied by an airbag ECU 100 that performs a control of activating a vehicle occupant protection device, such as an airbag and the like. However, the construction and functions of a vehicular data recording apparatus described below may be packaged in an ECU other than the airbag ECU 100, or may also be realized through cooperation of a plurality of ECUs.

The airbag ECU 100 operates using as an electric power source a battery 110 mounted in a vehicle. The battery 110 is typically disposed in an engine compartment positioned forward in the vehicle.

The occupant protection device may include airbags of seats for front impact (hereinafter, referred to as "front impact airbags"), seat belt pretensioners of seats for front impact (hereinafter, referred to as "front impact pretensioners"), side airbags for side impact (hereinafter, referred to as "side impact airbags"), curtain shield airbags for side impact or rollover (hereinafter, referred to as "side impact curtain shield airbags or rollover curtain shield airbags"), and may further include various other occupant protection devices, such as headrest airbags for rear seats, knee airbags of the driver and navigator seats for protecting occupant's knee portions, etc. Each occupant protection device is activated by an ignition device (squib) that is provided for causing generation of gas from an inflator and thereby instantaneously inflating the airbag, or the like.

Each occupant protection device may be an occupant protection device whose output level (protection performance) is variable, including, for example, various airbags whose deployment output is variable, a belt tension variable mechanism, etc. For brief reference to the airbags, as for example, the output level of airbags, that is, the deployment output (pressure) for airbags, can be adjusted by changing the number of inflators to be actuated among a plurality of inflators, or by changing the actuating timing of a plurality of inflators. In this case, the output level of the occupant protection device is determined in the airbag ECU 100.

The airbag ECU 100 is constructed of a microcomputer, and has, for example, a CPU, a ROM that stores control programs, a readable/writable RAM for storing results of computation and the like, a timer, a counter, an input interface, an output interface, etc.

As shown in FIG. 1, the airbag ECU 100 includes an activation control portion 12 and the data recording/retaining process portion 14 of the occupant protection devices. It is to be noted herein that the activation control portion 12 and the data recording/retaining process portion 14 in this embodiment correspond to the crash detection means and the recording process means in the invention.

The activation control portion 12 is detecting various crash forms for which the occupant protection device is designed to become activated, and performing a control of activating the occupant protection device on the basis of a relationship between the output information of the various sensors (see FIG. 2) mounted in the vehicle and a given activation determining condition. The various crash forms detected by the activation control portion 12 include, for example, front crashes (including head-on crashes, oblique crashes, pole crashes, etc.), side crashes (including right-side front seat crashes, left-side front seat crashes, right-side rear seat crashes, left-side rear seat crashes, etc.), and rollovers (right-side rollovers, left-side rollovers). Besides these, rear crashes may also be included.

Figure 2:
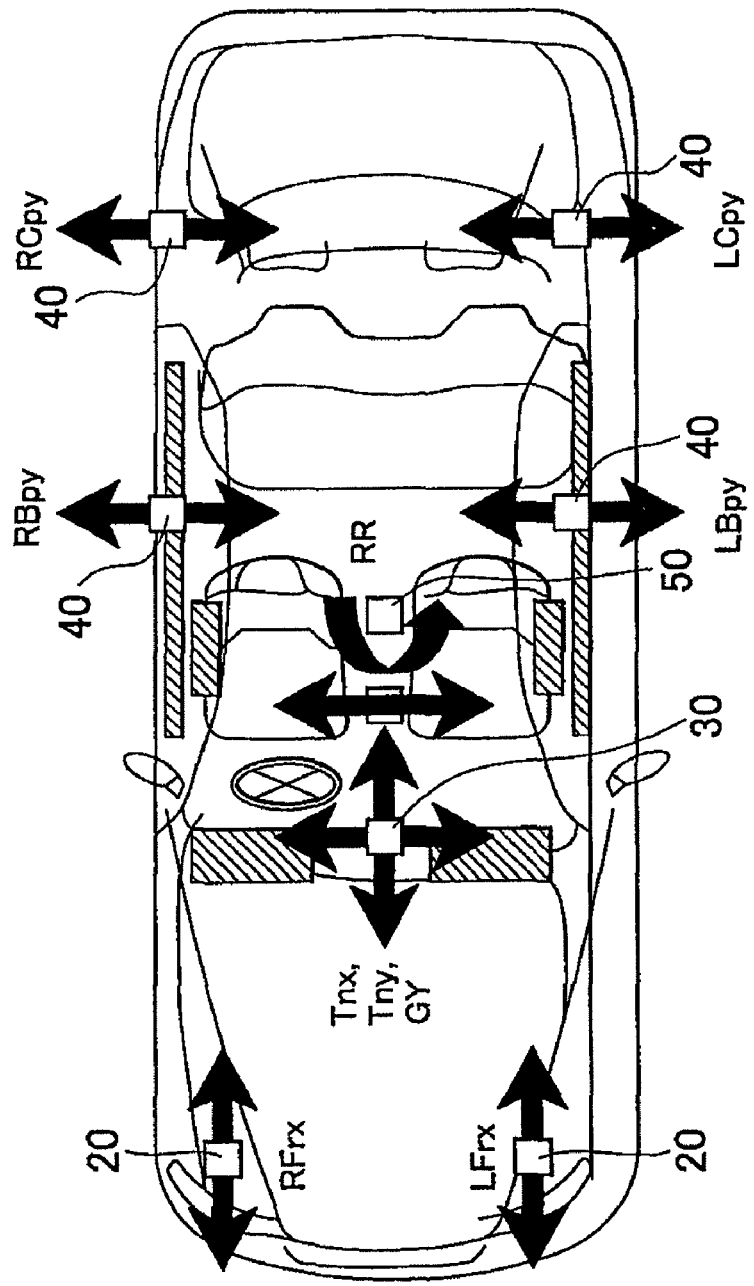
FIG. 2 is a schematic plan view showing an embodiment of various sensors mounted in a vehicle.

FIG. 2 is a schematic plan view of a vehicle showing an embodiment of various sensors (sensing system) mounted in the vehicle. In the embodiment shown in FIG. 2, front sensors 20 and a floor sensor 30 are shown as sensors for detecting a front crash. The front sensors 20 are single-axis acceleration sensors, and are mounted in right and left side portions of a front portion of the vehicle. As shown in FIG. 2, the front sensors 20 detect the accelerations $RFrx$, $LFrx$ in the longitudinal directions of the vehicle, respectively, which act on their mounting positions. The floor sensor 30 is a two-axis acceleration sensor mounted in a central portion of the vehicle (e.g., in a floor tunnel near a central console of the vehicle). As a front crash detecting sensor, the floor sensor 30 detects the acceleration $Tnx$ that acts on the mounting position in the longitudinal directions of the vehicle as shown in FIG. 2. Incidentally, the floor sensor 30 may be provided in a controller unit that includes the airbag ECU 100.

On the basis of the output value of the floor sensor 30, the activation control portion 12 computes an impact value (e.g., a value obtained through a predetermined filter process of the sensor signal, a value obtained through time integration of the sensor signal, a value obtained by integrating the sensor signal twice with respect to time). On the basis of a relationship between the computed impact value and a predetermined threshold value, the activation control portion 12 determines whether or not to activate the front impact airbags and the front impact pretensioners (hereinafter, represented by the "front impact airbags" for convenience). If the computed impact value exceeds the threshold value and therefore it is determined that the front impact airbags should be activated, an activation signal is sent out to an actuator device of the front impact airbags, whereby the activation of the front impact airbags is realized. On this occasion, a deployment output corresponding to the impact value may be instructed. The aforementioned threshold value may be variable on the basis of the impact value detected by the front sensors 20. This enables early activation determination for a front crash, and also enables activation determination factoring in the differences among the crash forms.

Furthermore in the embodiment shown in FIG. 2, left and right B/C pillar sensors 40 are provided as side impact detecting sensors, in addition to the floor sensor 30. The floor sensor 30 as a side impact detecting sensor detects the acceleration $Tny$ in the vehicle lateral direction which acts on its mounting position as shown in FIG. 2. The left and right B/C pillar sensors 40 are disposed on left and right B and C pillars, respectively, and detect accelerations $LBpy$, $RBpy$, $LCpy$, $RCpy$ that act on their mounting positions in the lateral directions of the vehicle as shown in FIG. 2.

Similarly, on the basis of the output values of the left and right B/C pillar sensors 40 and the output value of the floor sensor 30, the activation control portion 12 computes an impact value. On the basis of a relationship between the computed impact value and a predetermined threshold value, it is determined whether or not to activate the occupant protection device (e.g., side impact airbags, and side impact curtain shield airbags, which will be represented by the "side impact airbags" for convenience). If the computed impact value exceeds the threshold value and therefore it is determined that the side impact airbag should be activated, an activation signal is sent out to the actuator device of the side impact airbags, whereby actuation of the side impact airbags is realized. Incidentally, the side impact airbag to be activated at the time of determining that the side crash is going on is selected in accordance with various manners of side crash, that is, the right-side front seat crash, the left-side front seat crash, the right-side rear seat crash, the left-side rear seat crash, etc. Incidentally, as in the case of front crashes, it is possible to make a determination regarding the activation on the basis of the output value of the floor sensor 30 and a predetermined threshold value, and to use the output values of the left and right B/C pillar sensors 40 for varying the predetermined threshold value.

Still further, in the embodiment shown in FIG. 2, a roll rate sensor 50 is provided as a rollover detecting sensor, in addition to the floor sensor 30. The activation control portion 12 determines whether or not to activate rollover curtain shield airbags on the basis of the roll rate $RR$ detected by the roll rate sensor 50 (and/or the roll angle $RA$, that is, an integral value of the roll rate $RR$), and the lateral acceleration $GY$ detected by the floor sensor 30. On this occasion, determination regarding rollover may also be realized through the use of a map for rollover determination based on a relationship between the roll rate and the roll angle, and another map for rollover determination based on a relationship between the roll rate and the lateral acceleration. Likewise, for example, if the roll rate $RR$ exceeds a threshold value for the determination regarding rollover and therefore it is determined that the rollover curtain shield airbag should be activated, an activation signal is sent out to the actuator device of the rollover curtain shield airbags, whereby activation of the rollover curtain shield airbag is realized.

Incidentally, it should be apparent that the method of detection/determination of the various crash forms is not limited to the above-described method, but that the invention is applicable to any one of such methods of detection/determination. Furthermore, in the method of detection/determination of the various crash forms, it is possible to cooperatively use results of detection regarding obstacles around the vehicle, which are provided by a radar sensor and an image sensor.

The data recording/retaining process portion 14 performs a recording/retaining process on various data relevant to a crash so as to allow posterior analysis of the event (analysis of the causes of the crash and the situation of the vehicle before and after the crash, the situation of activation of the occupant protection device, etc.).

Figure 3:
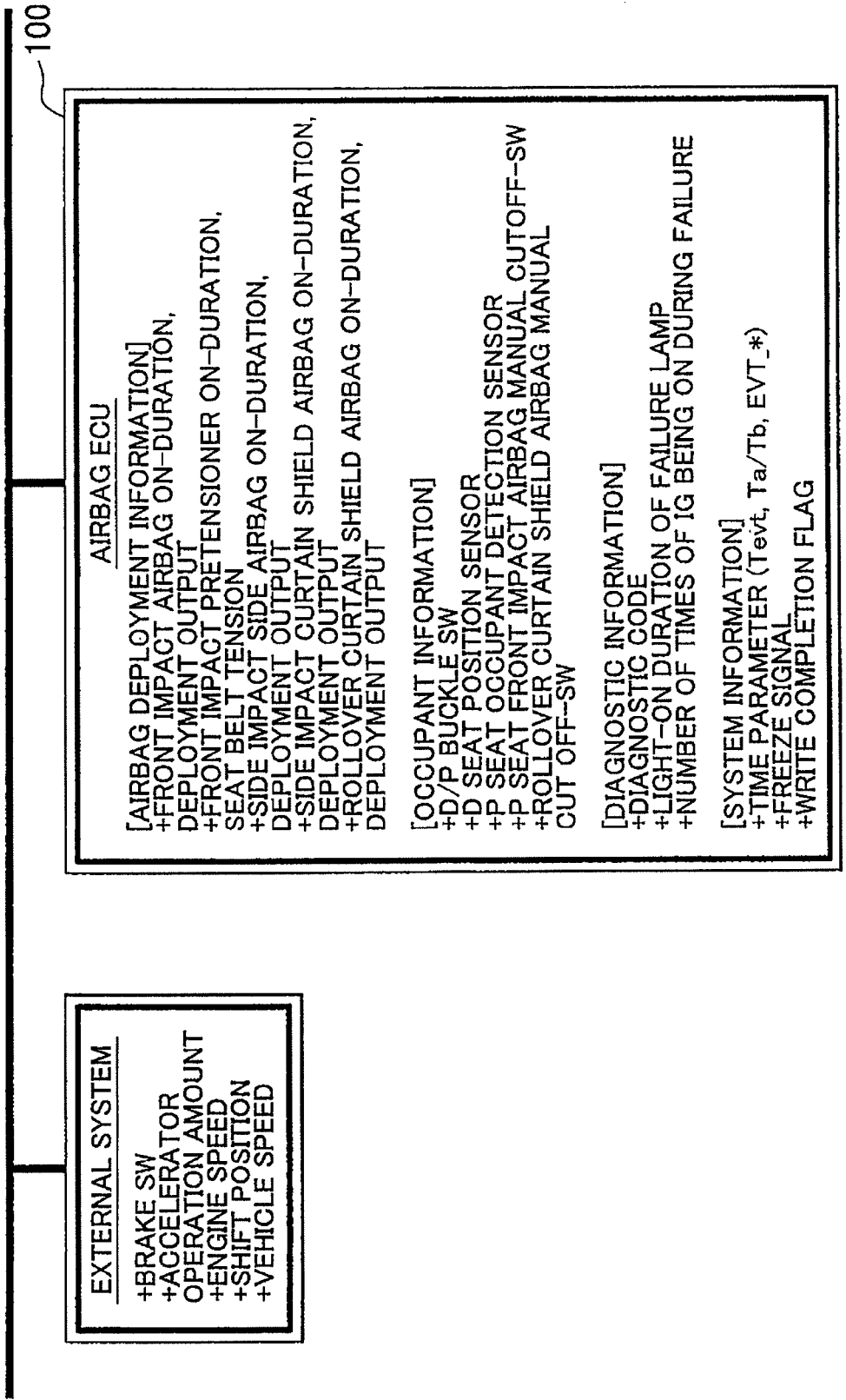
FIG. 3 is a diagram showing an example of record items that are recorded and retained by a data recording/retaining process portion 14.

FIG. 3 is a diagram showing an example of record items that are recorded and retained by the data recording/retaining process portion 14. In FIG. 3, the various record items are shown in association with the source of acquisition/generation of the information, for convenience. The data recording/retaining process portion 14 generates by itself various pieces of information as shown in FIG. 3 (details thereof will be described later as needed), or acquires pieces of information from external systems via a vehicle-mounted LAN (CAN (controller area network), or the like), and stores and retains the generated or acquired pieces of information in a non-volatile memory 70. The non-volatile memory 70 may be any kind of non-volatile memory, for example, an EEPROM, a hard disk, etc. The information acquired from external systems include, for example, brake operation information from a brake switch (or a brake stroke sensor for detecting the amount of brake operation, a master cylinder pressure sensor), an engine rotation speed information from an engine ECU (engine rotation speed sensor), shift position information (or gear speed information) from a shift position sensor, vehicle speed information from wheel speed sensors, and accelerator operation amount information from an accelerator operation amount sensor, as shown in FIG. 3.

The data recording/retaining process portion 14 records and retains different pieces of information in accordance with the crash forms detected by the activation control portion 12. For example, as indicated by circles in the column of "EDR (Event Data Recorder) record", the output data (Tnx) of the floor sensor 30, of all the sensor information, is set as a record item for the front crash. For the side crash, the output data of the left/right B/C pillar sensors 40 on the crash side (e.g., LBpy, LCpy in the case of a leftward side crash), and the output data (Tny) of the floor sensor 30, of all the sensor information, are set as record items. For the rollover, the output data (RR) of the roll rate sensor 50 and the output data (GY) of the floor sensor 30, of all the sensor information, are set as record items.

As for the airbag deployment information, too, different pieces of information are recorded and retained in accordance with different crash forms since the airbag deployment information is information regarding the airbags and the like that are activated. For example, for the front crash, the on-duration and the deployment output of the front impact airbag, and the on-duration and the seat belt tension of the front impact pretensioner are set as record items. For the side crash, the on-duration and the deployment output of the side impact airbag, and the on-duration and the deployment output of the side impact curtain shield airbag are set as record items. For the rollover, the on-duration and the deployment output of the rollover curtain shield airbag are set as record items. Incidentally, the on-duration refers to a duration from the generation of a TRG signal (described later) to the generation of an airbag activation signal.

On the other hand, the occupant information and the diagnostic information is recorded in principle when a crash form is detected, regardless of the difference in the crash form, as described below. However, as described below, if two crash forms occur continually in proximity in time, the information as mentioned above is recorded at the time of the first crash form, and is not recorded at the time of another crash form that secondarily occurs, so as to avoid waste due to redundancy. Incidentally, the system information will be described later.

It should be apparent that the information recorded and retained by the data recording/retaining process portion 14 is not limited to the foregoing information, but that the invention is applicable no matter what information is recorded and retained.

Figure 5:
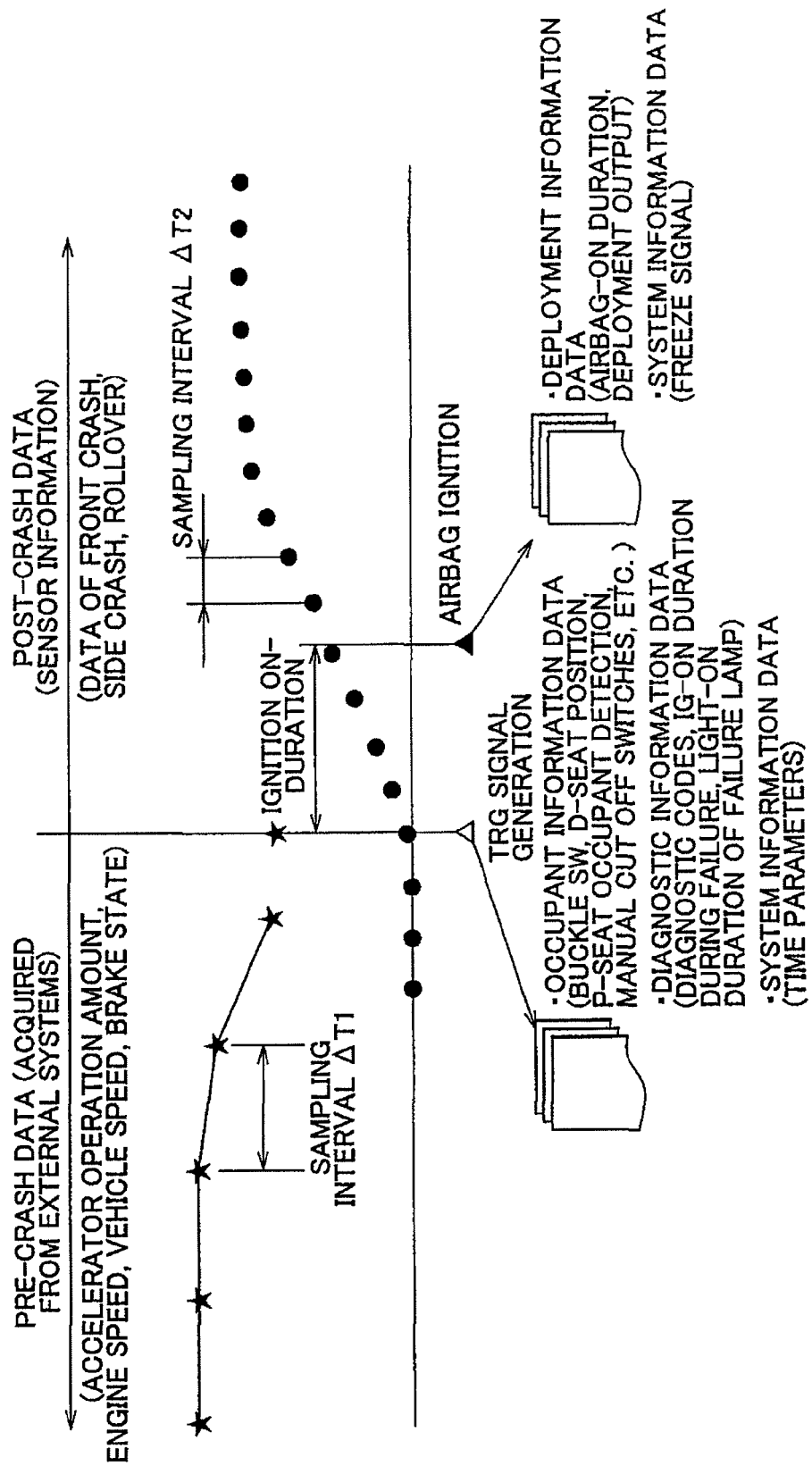
FIG. 5 is a timing chart schematically showing a data recording/retaining process executed by the data recording/retaining process portion 14 in the embodiment.

Next, with reference to FIG. 5, a data recording/retaining process executed in the data recording/retaining process portion 14 will be briefly described. The data recording/retaining process in the data recording/retaining process portion 14 is triggered by the generation of various TRG signals allowed under a predetermined condition for the generation. That is, each TRG signal is a signal that informs of a data record start timing, and is generated in the activation control portion 12. The activation control portion 12 generates different TRG signals in accordance with the crash forms. That is, the TRG signals include a TRG signal concerning the front crash (hereinafter, referred to as "front crash TRG"), a TRG signal concerning the side crash (hereinafter, referred to as "side crash TRG"), and a TRG signal concerning the rollover (hereinafter, referred to as "rollover TRG"). Each of these TRG signals is generated at latest before a corresponding one of the crash forms is detected, that is, before an activation signal for a corresponding one of the occupant protection devices is generated. For example, the activation control portion 12 may generate a TRG signal concerning the form of the ongoing crash when the sensor output for use for the foregoing determination regarding activation exceeds a threshold value that is smaller than the threshold value used for the foregoing determination regarding activation. Specifically, with regard to the front crash TRG, an appropriate threshold value (threshold for TRG) that is smaller (better in sensitivity) than the threshold value set for activation determination may be set for the impact value based on the output value of the front sensor 20. The front crash TRG may be generated when the impact value becomes greater than the threshold value set for the TRG. Likewise, with regard to the side crash TRG, an appropriate threshold value (threshold value set for TRG) smaller than the threshold value set for activation determination may be set for the impact value based on the output value of the floor sensor 30 and the left/right B/C pillar sensors 40. The side crash TRG may be generated when the impact value becomes greater than the threshold value set for TRG. Furthermore, likewise, with reference to the rollover TRG, an appropriate threshold value (threshold value set for TRG) smaller than the threshold value set for determination of rollover may be set. The rollover TRG may be generated when, for example, the roll rate RR or the lateral acceleration GY becomes greater than the threshold value set for TRG.

It should be apparent that the condition for generating a TRG signal is not limited to the foregoing conditions, but that the invention is applicable for any condition for TRG signal generation as long as the TRG signal is generated in an appropriate state prior to the fulfillment of the activating condition for the occupant protection device.

As described above, when a TRG signal is generated, the data recording/retaining process portion 14 records and retains pre-crash data provided within a predetermined period before the TRG generation as shown in FIG. 5. The pre-crash data is acquired from external systems mentioned above, and is related to the accelerator operation amount, the engine rotation speed, the vehicle speed, and the brake state. The data is stored in the RAM at predetermined sampling intervals ΔT1 as shown in FIG. 5. At the time of TRG generation, a predetermined sampling number of data preceding the TRG generation, of all the data stored in the RAM, are read from the RAM, and are written (recorded and retained) into the memory 70. This makes it possible to posteriorly grasp various states of the vehicle occurring immediately before a crash form occurs, by posteriorly analyzing the data retained in the memory 70.

Furthermore, the data recording/retaining process portion 14 writes (stores and retains) occupant information obtained at the time of TRG generation (which may be slightly before and after TRG generation) into the memory 70 as shown in FIG. 5. The occupant information may include, as also shown in FIG. 3, the on/off information regarding buckle switches (i.e., information as to whether or not the seat belt is fastened), the seat position of the driver seat, the occupant detecting sensor information regarding the passenger seats (i.e., information as to whether or not there is any occupant besides the driver), the on/off information regarding the manual cut switch of each passenger seat front impact airbag, the on/off information regarding the manual cut switch of each curtain shield airbag, etc. This makes it possible to posteriorly grasp the posture of each occupant, the state of occupant restraint achieved by the seat belts, and the setting of the various airbags, by posteriorly analyzing the data retained in the memory 70. From a similar standpoint, images of the occupants (particularly, images showing the orientation of the driver's face, and the like) taken by an in-vehicle camera may be stored and retained as occupant information, if such a camera is provided. Furthermore, if information useful for grasping the psychological state of the occupants (particularly, the driver), for example, voice data that can be picked up via an in-vehicle microphone, biological data, such as a pulse rate and the like, by a biological sensor embedded in the steering wheel or the like, etc., can be acquired, such psychological state-indicating information may also be stored and retained as occupant information. As for the psychological state-indicating information, data obtained during a predetermined period preceding the occurrence of a crash form may be stored and retained, similarly to the aforementioned pre-crash data, so as to allow posterior analysis of the psychological state (psychological changes and the like) of the driver preceding the occurrence of the crash form.

Furthermore, the data recording/retaining process portion 14 writes (stores and retains) diagnostic information into the memory 70 at the time of TRG occurrence (which may be slightly before or after TRG generation) as shown in FIG. 5. The diagnostic information may include, as also shown in FIG. 3, various diagnostic codes, the number of times of ignition switch being on (IG being on) during a failure, the light-on duration of a failure indicator lamp, etc.

Still further, the data recording/retaining process portion 14, as shown in FIG. 5, acquires sensor information in accordance with the kind of TRG signal (front crash TRG, side crash TRG, rollover TRG) as mentioned above on a predetermined sampling cycle ΔT2 and a predetermined length of recording time (see FIG. 8) after TRG generation, and writes (stores and retains) the information as post-crash data into the memory 70. This writing process is, in principle, executed in every sampling cycle ΔT2 by a one-by-one write-in method. Therefore, even if the occurrence of a crash form is followed by an electric power down of the vehicle (e.g., malfunction of the battery associated with direct impact thereon or deformation of surrounding members) or the like, at least the data obtained up to that moment can be recorded in the memory 70. Incidentally, the sampling cycle ΔT2 and the recording time length are appropriately determined in accordance with the characteristic of the crash form (i.e., the kind of TRG), and it is preferable that the sampling cycle ΔT2 be set shorter than the sampling cycle ΔT1. This is mainly because the post-crash data has greater changes over time than the pre-crash data. This makes it possible to efficiently record the most important data and minimize the data shortage resulting from the vehicle electric power down.

Furthermore, as shown in FIG. 5, if activation of any airbag device occurs after the TRG generation, the data recording/retaining process portion 14 similarly writes (stores and retains) into the memory 70 airbag deployment information concerning the activated airbag device. This makes it possible to posteriorly grasp whether or not the airbags concerned were properly activated, by posteriorly analyzing the data retained in the memory 70.

Furthermore, the data recording/retaining process portion 14, as shown in FIG. 5, writes (stores and retains) system information into the memory 70 following TRG generation. The system information may include, as also shown in FIG. 3, time parameters (described later with reference to FIG. 8), and may also include a write completion flag, a freeze signal, etc. The write completion flag is set at the time point of the end of the recording/retaining of the aforementioned post-crash data with a predetermined recording time length.

Incidentally, in this embodiment, recording processes corresponding to the various TRGs are executed, so that appropriate information corresponding to the various crash forms can be recorded for posterior analysis. This recording method does not pose a problem if a crash form singly occurs. However, if two or more crash forms continually occur in proximity in time, it is practically difficult to write the record items concerning the crash forms simultaneously (parallelly) into the memory 70. Therefore, this embodiment provides a data recording/retaining process that makes it possible to write proper information efficiently into the memory 70 in the case where two or more crash forms continually occur in proximity in time.

Figure 6:
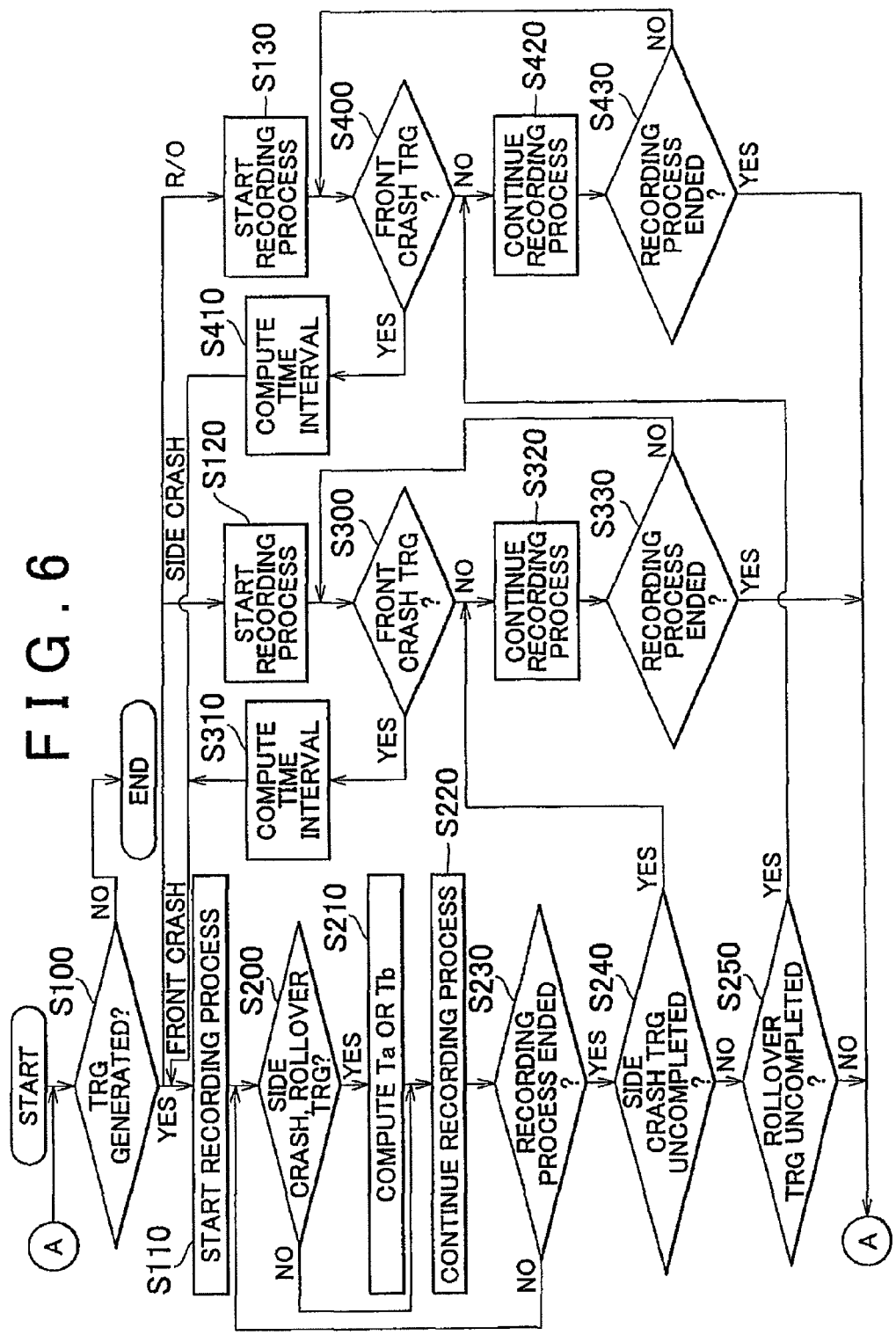
FIG. 6 is a flowchart showing a characteristic data recording/retaining process executed by the data recording/retaining process portion 14 in the embodiment.

FIG. 6 is a flowchart showing an embodiment of a data recording/retaining process executed by the data recording/retaining process portion 14. When the ignition switch of the vehicle is turned on, the process of this flowchart is repeatedly executed.

First, at step S100, the presence/absence of generation of a TRG signal is determined. If a TRG signal is generated (in the case of "YES"), the process shifts to step S110, S120 or S130 corresponding to the kind of TRG, and the data recording/retaining process starts to be performed in accordance with the various TRGs. If the determination of "NO" is made at step S100, the process of this flowchart is ended.

Hereinafter, description will be made separately for (1) the case where the front crash TRG is generated, (2) the case where the side crash TRG is generated, and (3) the case where the rollover TRG is generated.

Firstly, in (1) the case where the front crash TRG is generated, the recording process is continued (step S220) until the recording process ends (YES at step S230). During this recording process, it is determined whether or not the side crash TRG or the rollover TRG is generated (step S200). Regardless of the result of the determination, the post-crash data as well as the pre-crash data is recorded for a predetermined recording time length as long as there is not a vehicle electric power down. When the recording is completed (YES at step S230), a write completion flag is set. Thus, in this embodiment, in the case where the front crash TRG is generated initially, a state where the side crash TRG and rollover TRG are invalidated is maintained and the record items corresponding to the front crash TRG are continuously recorded, even if the side crash TRG or the rollover TRG is generated during the recording process (i.e., even if a side crash or a rollover secondarily occurs after the front crash occurs).

If during the recording process, the side crash TRG or the rollover TRG is generated (YES at step S200), the time amount Ta or Tb (a time parameter of the system information, shown in FIGS. 3 and 8) between the time of generation of the front crash TRG and the time of generation of the side crash TRG or rollover TRG is computed, and the computed time amount Ta or Tb is written into the memory 70 (step S210).

On the other hand, in (2) the case where the side crash TRG is generated, it is monitored and determined whether or not the front crash TRG is generated, until the recording process ends (YES at step S330). If the front crash TRG is generated (YES at step S300), the time amount between the time of generation of the side crash TRG and the time of generation of the front crash TRG is computed, and is written into the memory 70 (step S310). After that, the process from step S110 onward is executed. Thus, in the embodiment, if the side crash TRG is initially generated and then the front crash TRG is generated during the recording process (i.e., if after the occurrence of a side crash, a front crash secondarily occurs), the recording process concerning the side crash TRG is interrupted, and the record items corresponding to the front crash are preferentially recorded. In the process of step S110 following the process shift, the occupant information and the diagnostic information, which were recorded in step S120, are not written into the memory 70, so that waste due to redundancy is avoided.

In the case where the process has shifted to step S110 in the above-described manner, the recording process concerning the side crash TRG is temporarily interrupted. Then, when the preferential recording process for the record items corresponding to the front crash ends (YES at step S230), the recording process for the side crash is resumed and continued (step S320). It is to be noted herein that even during the interruption of the process of recording into the memory 70 in relation to the side crash TRG, the record items for the side crash are written into the RAM. Therefore, at the time of resumption, the data (e.g., sensor information) stored in the RAM during the interruption is read therefrom with reference to the write-in address in the RAM used immediately prior to the interruption, and is written into the memory 70 in batch. From then on, the sensor information acquired on the sampling cycle $\Delta T2$, and the like, is written in a one-by-one fashion in accordance with needs.

Similarly, in (3) the case where the rollover TRG is generated, it is monitored and determined whether or not the front crash TRG is generated, until the recording process ends (YES at step S430). If the front crash TRG is generated (YES at step S400), the time amount between the time of generation of the rollover TRG and the time of generation of the front crash TRG is computed, and is written into the memory 70 (step S410). After that, the process from step S110 onward is executed. Therefore, in this embodiment, if the rollover TRG is first generated and then the front crash TRG is generated during the recording process (i.e., if after the occurrence of a side crash, a front crash secondarily occurs), the recording process concerning the rollover TRG is interrupted, and the record items corresponding to the front crash TRG are preferentially recorded. In the process of step S110 following the process shift, the occupant information and the diagnostic information, which were recorded in step S130, are not written into the memory 70, so that waste due to redundancy is avoided.

In the case where the process has shifted to step S110 in the above-described manner, the recording process concerning the rollover crash TRG is temporarily interrupted. Then, after the preferential recording process for the record items corresponding to the front crash has ended (YES at step S230), and after, if a side crash occurred prior to that moment, the recording process for the record items corresponding to the side crash has ended (NO at step S240), the recording process for the rollover is resumed and continued (step S420). It is to be noted herein that even during the interruption of the process of recording into the memory 70 in relation to the rollover TRG, the record items for the rollover are written into the RAM. Therefore, at the time of resumption, the data (e.g., sensor information) stored in the RAM during the interruption is read therefrom with reference to the write-in address in the RAM used immediately prior to the interruption, and is written into the memory 70 in batch. From then on, the sensor information acquired on the sampling cycle $\Delta T2$, and the like, is written in a one-by-one fashion in accordance with needs.

Thus, in the embodiment, if the front crash TRG and at least one of the side crash TRG and the rollover TRG are generated in proximity in time, the recording process concerning the front crash TRG is preferentially executed regardless of their sequence in time. Therefore, if the front crash TRG is first generated and then the side crash TRG or the rollover TRG is immediately generated, the record items corresponding to the front crash are continuously recorded until the recording is completed. In this manner, the recording process for the record items corresponding to the front crash will not be impeded by subsequent generation of the side crash TRG or the rollover TRG. On the other hand, if the side crash TRG or the rollover TRG is first generated and then the front crash TRG is immediately generated, the record items corresponding to the front crash are preferentially recorded. Reasons for this are as follows. In the case of the front crash, compared with the other crash forms, the amount of deformation/intrusion of the engine compartment is large, and the possibility of vehicle electric power down is also high since the battery 110 is disposed in the engine compartment. If the recording process concerning any other crash form is given priority, it can become impossible to record and recover the record data concerning the front crash, which is the most important and useful, due to a vehicle electric power down that may well occur at the time of a front crash.

Figure 7A:
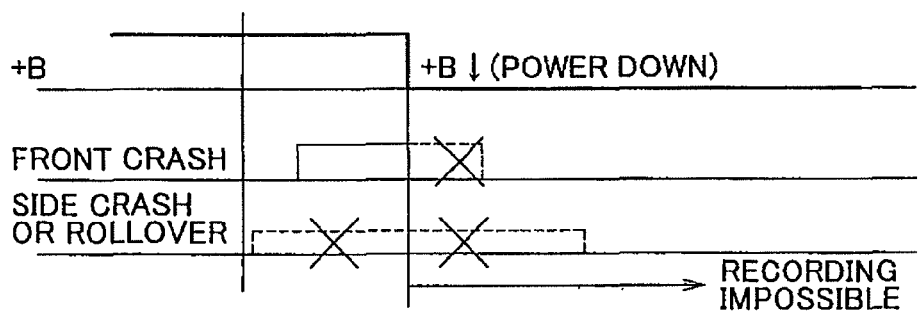
FIGS. 7A and 7B are diagrams showing results of recording in the case where a vehicle electric power down occurs during a recording/retaining process.
Figure 7B:
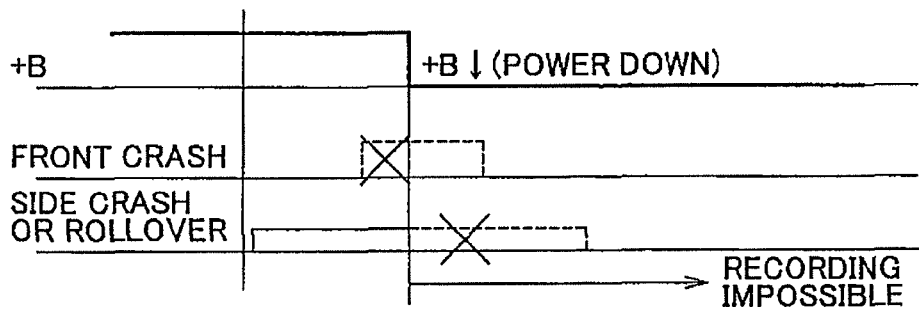

FIGS. 7A and 7B are diagrams showing results of recording in the case where vehicle electric power down occurs during a recording/retaining process. FIG. 7A shows results of recording in the embodiment, and FIG. 7B shows ordinary results of recording in the case where the recording process for the front crash TRG is not given priority over the recording process for the other crash forms. The results of recording shown in both FIGS. 7A and 7B are those obtained in the case where the side crash TRG or the rollover TRG is first generated and then the front crash TRG is immediately generated.

In this embodiment, as shown in FIG. 7A, the recording process for the front crash is given priority over the recording processes for the other crash forms, the recording of the record items concerning the front crash can be recoverably carried out at least until immediately before the vehicle electric power down (see the position of fall of +B) if the power down happens after the occurrence of the front crash. In this case, it is impossible, however, to recoverably carry out the recording of the record items concerning the side crash or the rollover until immediately before the vehicle electric power down (in some cases, a portion of the recording prior to the interruption is recoverable). However, since the record data concerning the front crash which is most importance and useful is recorded recoverably, the influence of the vehicle electric power down on the posterior analysis can be minimized.

In contrast, if the recording process for the front crash is not given priority over the recording processes for the other crash forms, the occurrence of a vehicle electric power down following the occurrence of a front crash, as shown in FIG. 7B, results in no recording of the record items concerning the front crash which are the most important and useful (therefore, it is impossible to recover such recording) although the recording of the record items concerning the side crash or rollover can be recoverably carried out until immediately before the vehicle electric power down.

Thus, according to the embodiment, as a preparation for the vehicle electric power down that is likely to occur following the occurrence of a front crash, a construction is made such that if the side crash TRG or the rollover TRG is generated first in time and then the front crash TRG is immediately generated, the record items concerning the front crash are subjected to the recording process preferentially over the record items concerning the side crash or rollover. Therefore, it becomes possible to reliably recover the recording of the record items concerning the front crash which are the most important and useful in the posterior analysis.

Figure 8:
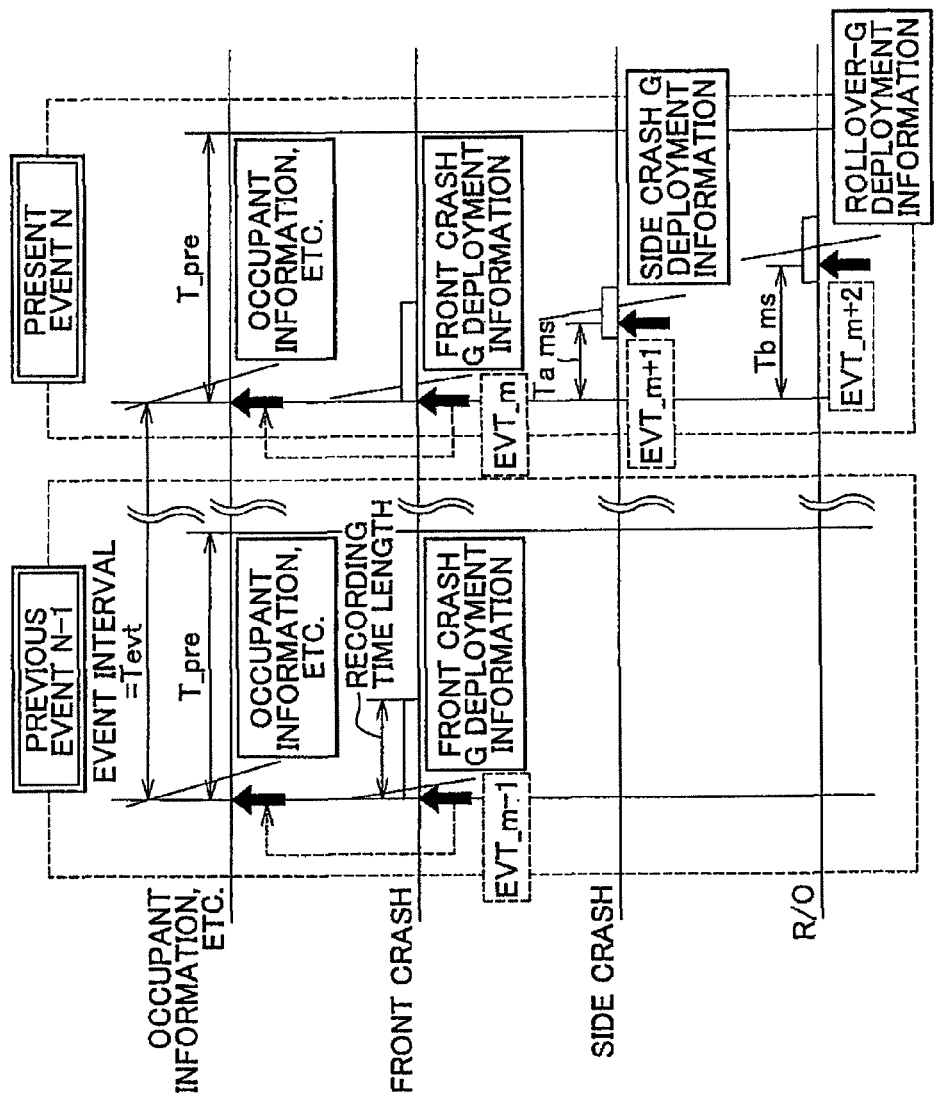
FIG. 8 is a diagram showing in time series an example of system information as well as a data recording fashion according to the embodiment.

FIG. 8 is a diagram showing in time series an example of system information as well as a data recording fashion according to the embodiment as shown in the flowchart of FIG. 6. As shown in FIG. 8, the aforementioned various record items are recorded in correspondence to events in which the record items were acquired. That is, in the example shown in FIG. 8, only the front crash TRG was generated in the previous event N−1, and the record items (occupant information, and the like) were recorded in correspondence to the event number N−1. In the present event N, the front crash TRG is followed by the occurrence of the side crash TRG and the occurrence of the rollover TRG, and the record items (occupant information, and the like) are recorded in correspondence to the event number N.

It is to be noted herein that an event refers to a basic unit that can be separated as a crash phenomenon and, in some cases, a plurality of crash forms can occur continually during one event. Therefore, even the case where the generation of the first TRG is followed by the generation of another TRG within a predetermined short time T_pre [ms] is considered as a single event by the data recording/retaining process portion 14. As described above, if another TRG is generated before the time T_pre elapses following the occurrence of the first TRG, the recording of occupant information and the like in response to the another TRG is prohibited so as to eliminate redundancy and save memory capacity. More specifically, the recording of occupant information and diagnostic data is prohibited.

Thus, in the embodiment, various pieces of information are recorded in correspondence to the events in which the pieces of information are acquired. Therefore, even if data has been recorded over a plurality of events, it is clear in which of the events a piece of information was acquired, so that the posterior analysis becomes easy.

Furthermore, if two or more events occur as shown in FIG. 8, the time interval between the times of the first TRG generation in the individual events, that is, the event interval Tevt [ms], is computed (measured), and is recorded and retained as system information (time parameter). Therefore, it is clear at what time interval two or more events occurred, so that the posterior analysis becomes easy.

Still further, if a plurality of crash forms (TRGs) occur within an event as mentioned above (also as shown in FIG. 8), the time intervals Ta [ms], Tb [ms] therebetween are computed (measured), and are recorded and retained as system information (time parameter). Therefore, it is clear at what time intervals the crash forms occurred within the event, so that the posterior analysis becomes easy.

Furthermore, if a plurality of TRGs are generated, the numbers (serial numbers) EVT_* assigned thereto in accordance with the sequence of generation are recorded and retained as system information. For example, in the example shown in FIG. 8, number EVT_m−1 (meaning the m−1th in sequence) is assigned to the front crash TRG of the event N−1; number EVT_m is assigned to the front crash TRG of the event N; number EVT_m+1 is assigned to the side crash TRG of the event N; and number EVT_m+2 is assigned to the rollover TRG of the event N. Therefore, even if data regarding two or more crashes (including crashes in the same event or different events) has been recorded, it is clear in what sequence the two or more crashes (including crashes in the same event or different events) occurred. Thus, the posterior analysis becomes easy. The serial numbers EVT_* are redundant pieces of information with respect to the other pieces of system information Ta, Tb, and are recorded for improvement in data precision.

While preferred embodiments of the invention have been described in detail above, the invention is not restricted by the foregoing embodiments. On the contrary, it is possible to add various modifications and substitutions to the foregoing embodiments without departing from the scope of the invention.

For example, although in the foregoing embodiments, the process performed in the case where the side crash TRG and the rollover TRG are generated in proximity in time is not explicitly demonstrated, the side crash may be given priority in that case on the basis of a concept similar to the relationship between the front crash TRG and the side crash TRG or the rollover TRG; or the recording may be performed by a FIFO (first-in, first-out) method.

Furthermore, if a plurality of crashes are detected continually within a short time, the order of priority for data recording may be determined on the basis of the time of detection of each crash. Still further, in the foregoing embodiments, the data relevant to a crash low in the order of priority is recorded after completion of the recording of the data relevant to a crash high in the order of priority. However, the recording of the data relevant to a crash low in the order of priority may be omitted after completion of the recording of the data relevant to a crash high in the order of priority.

The invention claimed is:

1. A vehicular data recording apparatus that performs a data recording/retaining process relevant to a crash of a vehicle, comprising:
   a crash detection portion configured to detect a crash of the vehicle; and
   a recording process portion configured to record and retain output data of various vehicle-mounted sensors mounted in the vehicle, in a non-volatile memory,
   wherein if a plurality of crashes are detected continually in close proximity in time by the crash detection portion, the recording process portion is configured to perform a data recording/retaining process relevant to each crash in accordance with a predetermined order of priority of each crash,
   wherein if a plurality of crashes different in crash form are detected continually in a short time by the crash detection portion, the recording process portion is configured to perform the data recording/retaining process relevant to each crash in accordance with an order of priority based on the crash form of each crash, and
   wherein if, during the data recording/retaining process relevant to a first crash following detection of the first crash, a second crash higher in the order of priority than the first crash is detected by the crash detection portion, the recording process portion is configured to interrupt the data recording/retaining process relevant to the first crash, and configured to perform the data recording/retaining process relevant to the second crash.

2. The vehicular data recording apparatus according to claim 1, wherein during the data recording/retaining process relevant to a first crash following detection of the first crash, the recording process portion is configured to prohibit the data recording/retaining process relevant to a crash other than the first crash.

3. The vehicular data recording apparatus according to claim 1, wherein the recording process portion is configured to perform the data recording/retaining process relevant to the crash low in the order of priority after completing the data recording/retaining process relevant to the crash high in the order of priority.

4. The vehicular data recording apparatus according to claim 1, wherein the crash detection portion is configured to perform detection of a crash, and configured to determine a crash form based on an output value of the various vehicle-mounted sensors mounted in the vehicle.

5. The vehicular data recording apparatus according to claim 1, wherein data recorded and retained by the recording process portion after a crash is detected by the crash detection portion includes at least one of on/off information regarding a buckle switch, occupant detecting sensor information, on/off information regarding a manual cut switch of an airbag, a diagnostic code, a number of times of IG being on during a failure, a light-on duration of a failure lamp, a time parameter, a write completion flag, and a freeze signal.

6. The vehicular data recording apparatus according to claim 1, wherein data recorded and retained by the recording process portion further includes at least one of brake operation information, engine rotation speed information, shift position information, a vehicle speed, and an accelerator operation amount.

7. The vehicular data recording apparatus according to claim 5, wherein data recorded and retained by the recording process portion further includes at least one of brake operation information, engine rotation speed information, shift position information, a vehicle speed, and an accelerator operation amount.

8. A vehicular data recording apparatus that performs a data recording/retaining process relevant to a crash of a vehicle, comprising:
a crash detection portion configured to detect a crash of the vehicle; and
a recording process portion configured to record and retain output data of various vehicle-mounted sensors mounted in the vehicle, in a non-volatile memory,
wherein if a crash is detected by the crash detection portion, the recording process portion is configured to record and retain relevant information that indicates a state of an occupant and/or a state of the vehicle occurring at a time of detection of the crash or in a predetermined time preceding the time of detection of the crash, together with the output data of a predetermined vehicle-mounted sensor following the crash, and wherein if a plurality of crashes are detected continually in close proximity in time by the crash detection portion, the recording process portion is configured to not record or retain the relevant information concerning the second or later-detected crash.

9. The vehicular data recording apparatus according to claim 1, wherein one event is considered to last from occurrence of an initial crash until elapse of a predetermined time, and if another crash occurs within a same event, the same event is still considered as one event, and the recording process portion is configured to perform the data recording process relevant to the crash in correspondence to the event in which the crash occurred.

10. The vehicular data recording apparatus according to claim 9, wherein if a plurality of crashes occur in the same event, predetermined information is recorded at a time of the first occurring crash in the same event, and the predetermined information is not recorded at times of the second and later occurring crashes in the same event.

11. A method of performing data recording/retention relevant to a crash of a vehicle, comprising:
detecting a crash of the vehicle; and
recording and retaining output data of various vehicle-mounted sensors mounted in the vehicle, in a non-volatile memory,
wherein if a plurality of crashes are detected continually in close proximity in time, a data recording/retaining process relevant to each crash is performed in the recording and retaining step in accordance with a predetermined order of priority of each crash, and
wherein if a plurality of crashes different in crash form are detected continually in a short time, the data recording/retaining process relevant to each crash is performed in accordance with an order of priority based on the crash form of each crash, and
wherein if, during the data recording/retaining process relevant to a first crash following detection of the first crash, a second crash higher in the order of priority than the first crash is detected, the data recording/retaining process relevant to the first crash is interrupted, and the data recording/retaining process relevant to the second crash is performed.

12. A vehicular data recording apparatus comprising:
crash detection means for detecting a crash of a vehicle, and
recording process means for recording and retaining output data of various vehicle-mounted sensors mounted in the vehicle, in a non-volatile memory,
wherein if a crash is detected by the crash detection means, a data recording/retaining process relevant to the crash is performed by the recording process means,
wherein if a plurality of crashes are detected continually in close proximity in time by the crash detection means, the recording process means performs the data recording/retaining process relevant to each crash in accordance with a predetermined order of priority of each crash, and
wherein if a plurality of crashes different in crash form are detected continually in a short time by the crash detection means, the recording process means is configured to perform the data recording/retaining process relevant to each crash in accordance with an order of priority based on the crash form of each crash, and
wherein if, during the data recording/retaining process relevant to a first crash following detection of the first crash, a second crash higher in the order of priority than the first crash is detected by the crash detection means, the recording process means is configured to interrupt the data recording/retaining process relevant to the first crash, and configured to perform the data recording/retaining process relevant to the second crash.

* * * * *